United States Patent
Kim et al.

(10) Patent No.: US 9,873,127 B2
(45) Date of Patent: Jan. 23, 2018

(54) AIR CLEANER

(71) Applicant: SAMSUNG ELECTRONICS CO., LTD., Suwon-si, Gyeonggi-do (KR)

(72) Inventors: Mun Sub Kim, Suwon-si (KR); Hyun-Wuk Kang, Suwon-si (KR); Ju Young Kim, Seongnam-si (KR); Woo Seog Song, Yongin-si (KR); Jin Yong Mo, Anyang-si (KR); Hyeong Joon Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 14/734,546

(22) Filed: Jun. 9, 2015

(65) Prior Publication Data

US 2015/0352479 A1 Dec. 10, 2015

(30) Foreign Application Priority Data

Jun. 9, 2014 (KR) .................... 10-2014-0069250

(51) Int. Cl.
*F24F 7/007* (2006.01)
*B03C 3/12* (2006.01)
(Continued)

(52) U.S. Cl.
CPC ................. *B03C 3/12* (2013.01); *B03C 3/09* (2013.01); *B03C 3/155* (2013.01); *B03C 3/32* (2013.01);
(Continued)

(58) Field of Classification Search
CPC ........ B01D 45/06; B01D 45/08; B01D 53/32; B03C 3/017; B03C 3/32; B03C 3/155;
(Continued)

(56) References Cited

U.S. PATENT DOCUMENTS 4,541,847 A * 9/1985 Oie ....................... B03C 3/019
55/467
4,737,173 A * 4/1988 Kudirka ............. B01D 46/0023
55/470
(Continued)

FOREIGN PATENT DOCUMENTS

CN 101113828 A 1/2008
EP 0 598 684 A1 5/1994
(Continued)

OTHER PUBLICATIONS

Extended European Search Report dated Mar. 3, 2016 in corresponding European Patent Application No. 15171224.7.

*Primary Examiner* — Duane Smith
*Assistant Examiner* — Minh-Chau Pham
(74) *Attorney, Agent, or Firm* — Staas & Halsey LLP

(57) ABSTRACT

An air cleaner, which allows air to flow smoothly, has increased strength, and reduces noise generated when a blower fan rotates. The air cleaner includes a main body including an inlet and an outlet, a blower fan provided inside of the main body, and configured to induce air from outside of the main body to be suctioned into the inlet and to be discharged to the outlet, a motor configured to drive the blower fan, and a fan guard to which the motor is fixed, and configured to guide air suctioned into the inlet to the blower fan, where the fan guard is provided to include a plurality of bent cross sections arranged in a radial direction at different distances from the motor.

15 Claims, 11 Drawing Sheets

(51) Int. Cl.
*B03C 3/32* (2006.01)
*F24F 3/16* (2006.01)
*B03C 3/09* (2006.01)
*B03C 3/155* (2006.01)

(52) U.S. Cl.
CPC ............... *F24F 3/16* (2013.01); *F24F 7/007* (2013.01); *F24F 2003/1614* (2013.01); *F24F 2003/1664* (2013.01)

(58) Field of Classification Search
CPC ... F24F 3/166; F24F 2003/1682; F41H 7/035; F41H 7/044; F41H 7/04
USPC ......... 55/434, 462, 467, 471, 473, 398, 401, 55/403, 406, 456; 96/62, 63, 97, 222; 89/36.02; 261/DIG. 88
See application file for complete search history.

(56) References Cited

U.S. PATENT DOCUMENTS

| | | |
|---|---|---|
| 5,466,120 A | 11/1995 | Takeuchi et al. |
| 6,280,493 B1 * | 8/2001 | Eubank ................ B01D 45/14 55/398 |
| 7,537,647 B2 * | 5/2009 | Adair ................ B01D 45/06 261/DIG. 88 |
| 2002/0088213 A1 * | 7/2002 | McSweeney ............. F24F 3/16 55/467 |
| 2003/0005668 A1 * | 1/2003 | Huang ................ B01D 46/42 55/467 |
| 2003/0010001 A1 * | 1/2003 | Bryce ................ B01D 46/0005 55/467 |
| 2010/0089243 A1 * | 4/2010 | Bailey ................ B01D 46/0013 96/222 |
| 2014/0251120 A1 * | 9/2014 | Schade .................. F41H 7/035 89/36.02 |
| 2016/0184753 A1 * | 6/2016 | Chu .................... B01D 46/002 96/74 |

FOREIGN PATENT DOCUMENTS

| | | | |
|---|---|---|---|
| EP | 1 120 571 A1 | 8/2001 | |
| JP | 60-132616 | 7/1985 | |
| JP | 2008025422 | 2/2008 | |
| JP | 4285586 | 6/2009 | |
| KR | 10-2014-0141775 | * 11/2014 | ............ B01D 46/42 |
| WO | 03/054395 A1 | 7/2003 | |
| WO | 2013/141511 A1 | 9/2013 | |

* cited by examiner

AIR CLEANER

CROSS-REFERENCE TO RELATED APPLICATIONS

This application claims the benefit of Korean Patent Application No. 10-2014-0069250, filed on Jun. 9, 2014 in the Korean Intellectual Property Office, the disclosure of which is incorporated herein by reference.

BACKGROUND

1. Field

Embodiments relate to an air cleaner which includes an improved fan guard with increased strength and configured to enable air to smoothly flow.

2. Description of the Related Art

In general, an air cleaner is a device provided indoors and configured to filter or sterilize particles in air.

An air cleaner includes a main body configured to form an appearance, a blower fan provided in the main body and configured to enable air from an outside of the main body to be suctioned into an inside of the main body and to be discharged to an outside of the main body, and a motor configured to drive the blower fan.

The main body is provided with an inlet configured to suction air from an outside of the main body into an inside of the main body, and an outlet configured to discharge air suctioned into the inside of the main body to the outside of the main body, and air suctioned into the inlet is cleaned by a filter and discharged through the outlet.

The blower fan is disposed at an air path configured to connect the inlet and the outlet in an inside of the main body, and is driven by the motor.

The motor is provided to rotate a driving shaft with the same center of rotation as the blower fan, and fixed to a fan guard of an inside of the main body.

The fan guard fixes the motor and simultaneously guides air suctioned into the inlet to the blower fan.

The fan guard includes a guide grill configured to guide air suctioned into the inlet to the blower fan, and a motor installation portion in which the motor is installed.

The guide grill includes a plurality of ribs configured to form a plurality of openings so as to guide air suctioned into the inlet to the blower fan.

The guide grill needs sufficient strength to support a static load and a dynamic load of the blower fan and the motor.

Even though a thickness of ribs which are provided in a plurality may be capable of being thickened or the number of ribs is increased so as to increase the strength of the guide grill, there is a problem in which air flowing through the opening does not smoothly flow when the thickness of the rib becomes thicker or the number of ribs is increased.

Thus, an improved fan guard with increased strength and in which air smoothly flows is needed.

SUMMARY

Therefore, it is an aspect of at least one embodiment to provide an air cleaner which includes an improved fan guard with increased strength and configured to enable air to smoothly flow.

In addition, it is another aspect of an embodiment to provide an air cleaner which includes an improved fan guard configured to reduce a noise generated when a blower fan rotates, and increase the strength of a motor installation portion in which a motor is installed.

Additional aspects of the invention will be set forth in part in the description which follows and, in part, will be obvious from the description, or may be learned by practice of the invention.

In accordance with one aspect of an embodiment, an air cleaner includes a main body including an inlet and an outlet, a blower fan provided in an inside of the main body, and configured to induce air outside of the main body to be suctioned into the inlet and to be discharged to the outlet, a motor configured to drive the blower fan, and a fan guard in which the motor is fixed, and configured to guide air suctioned into the inlet to the blower fan, and the fan guard is provided to include a plurality of bent cross sections.

The main body may include a case including the outlet, a front panel disposed at a front side of the case, and a back panel disposed at a back side of the case and including the inlet.

The case may include a case body including the outlet at two sidewalls thereof and configured to accommodate the blower fan and the motor, a base provided at a lower portion of the case body and configured to support the main body, an upper cover provided at an upper portion of the case body, and a duct including a guide path configured to guide air suctioned into the inlet to the outlet.

The case body may include a partition to form a space in which the blower fan and the motor are accommodated between the case body and the front panel, and the fan guard is provided at the partition.

The fan guard may include a guide grill configured to guide air suctioned into the inlet to the blower fan, and a motor installation portion in which the motor is installed.

The guide grill may include a plurality of ribs forming a plurality of openings so as to guide air suctioned into the inlet to the blower fan, and may be provided to have a plurality of bent cross sections to increase the strength thereof.

The guide grill may include a first bent portion bent to have a shape protruding from the partition toward a rear of the partition, a second bent portion bent to have a shape protruding from the first bent portion toward a front of the partition, and a third bent portion bent to have a shape protruding from the second bent portion toward the rear of the partition.

A gap between a back end of a blade of the blower fan and the first bent portion may be provided to be wider than a gap between the back end of the blade of the blower fan and the partition.

The second bent portion may be provided to protrude forward more than the partition.

The motor installation portion may be provided at the second bent portion, and include a plurality of supports configured to support the motor.

A part of a lower portion of the motor supported by the plurality of supports may be accommodated inside of the third bent portion.

The plurality of supports may be provided to have a lower height than the motor.

In accordance with another aspect of the present invention, an air cleaner includes a main body including an inlet and an outlet, a blower fan provided at an inside of the main body, and configured to induce air outside of the main body to be suctioned into the inlet to be discharged to the outlet, a motor configured to drive the blower fan, and a fan guard including a guide grill configured to guide air suctioned into the inlet to the blower fan, and a motor installation portion in which the motor is installed at the guide grill, and an edge portion of the guide grill adjacent to a blade of the blower fan is bent to have a shape protruding away from the blade of the blower fan, and a portion including the motor installation portion of the guide grill is bent to have a shape protruding toward the motor.

The guide grill may include a first bent portion bent to have a shape protruding away from the blade of the blower fan at the edge of the guide grill, a second bent portion bent to have a shape protruding from the first bent portion in a direction opposite to the first bent portion, and a third bent portion bent to have a shape protruding from the second bent portion in the same direction as the first bent portion.

The motor installation portion may be provided at the second bent portion, and include a plurality of supports configured to support the motor.

The plurality of supports may be provided to have a rod shape protruding from the second bent portion toward the motor.

In an embodiment in which the plurality of supports are provided at the second bent portion, and a part of a lower portion of the motor supported by the plurality of supports is accommodated inside of the third bent portion configured to protrude toward an opposite direction to the second bent portion, the plurality of supports may have a lower height than the motor.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
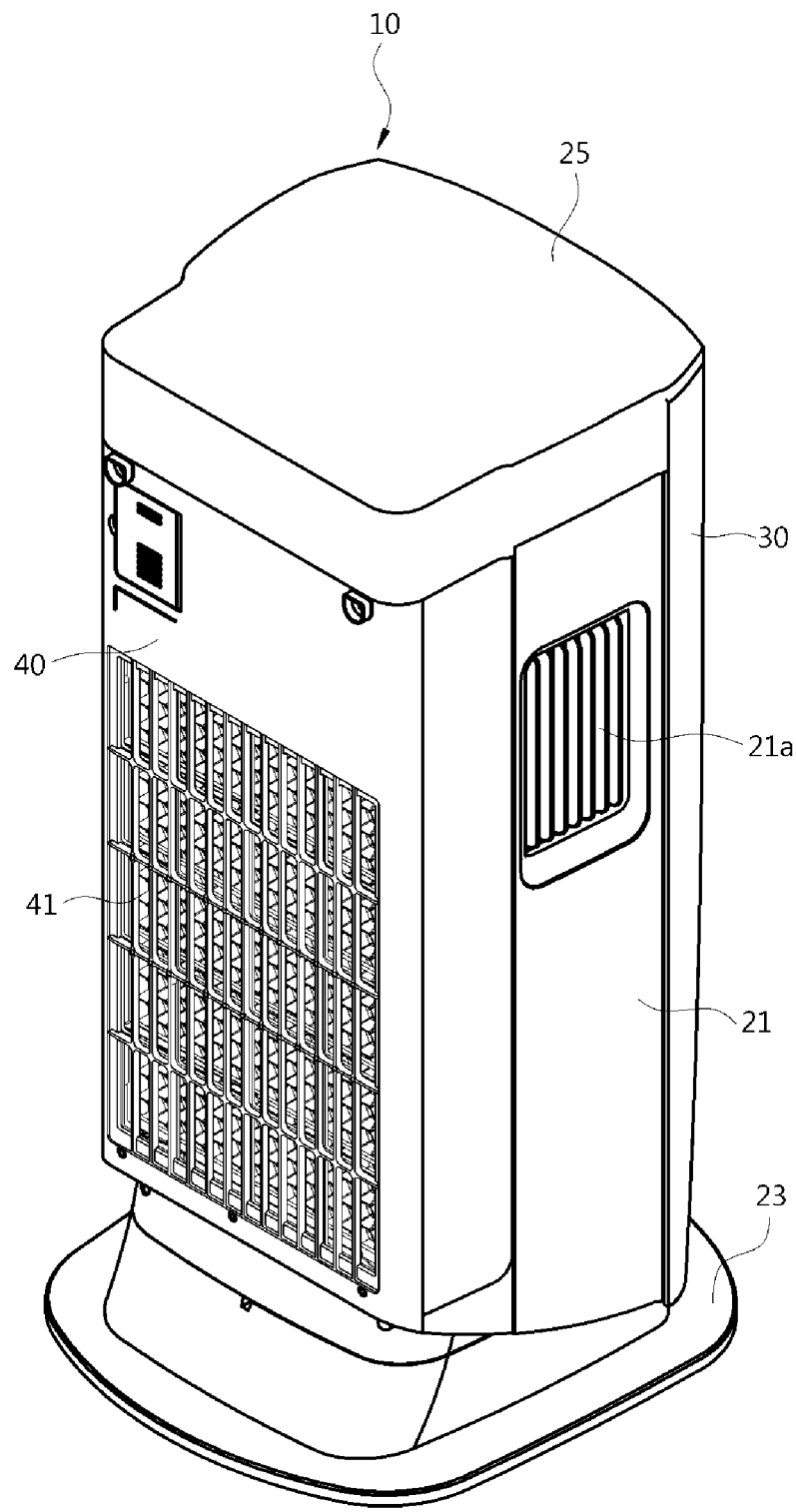
FIG. 1 is a perspective view illustrating an air cleaner according to an embodiment.

Reference will now be made in detail to the embodiments of the present invention, examples of which are illustrated in the accompanying drawings, wherein like reference numerals refer to like elements throughout.

Embodiments will be described in detail in accordance with accompanying drawings.

Figure 2:
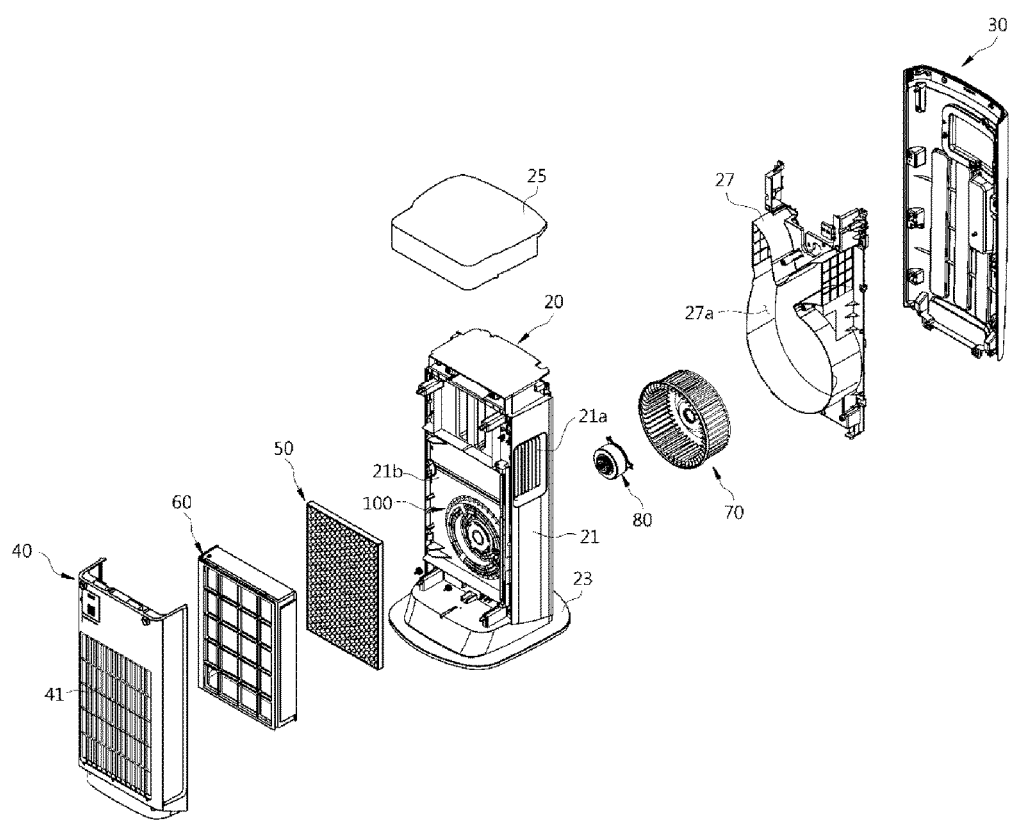
FIG. 2 is an exploded perspective view illustrating an air cleaner according to an embodiment.
Figure 3:
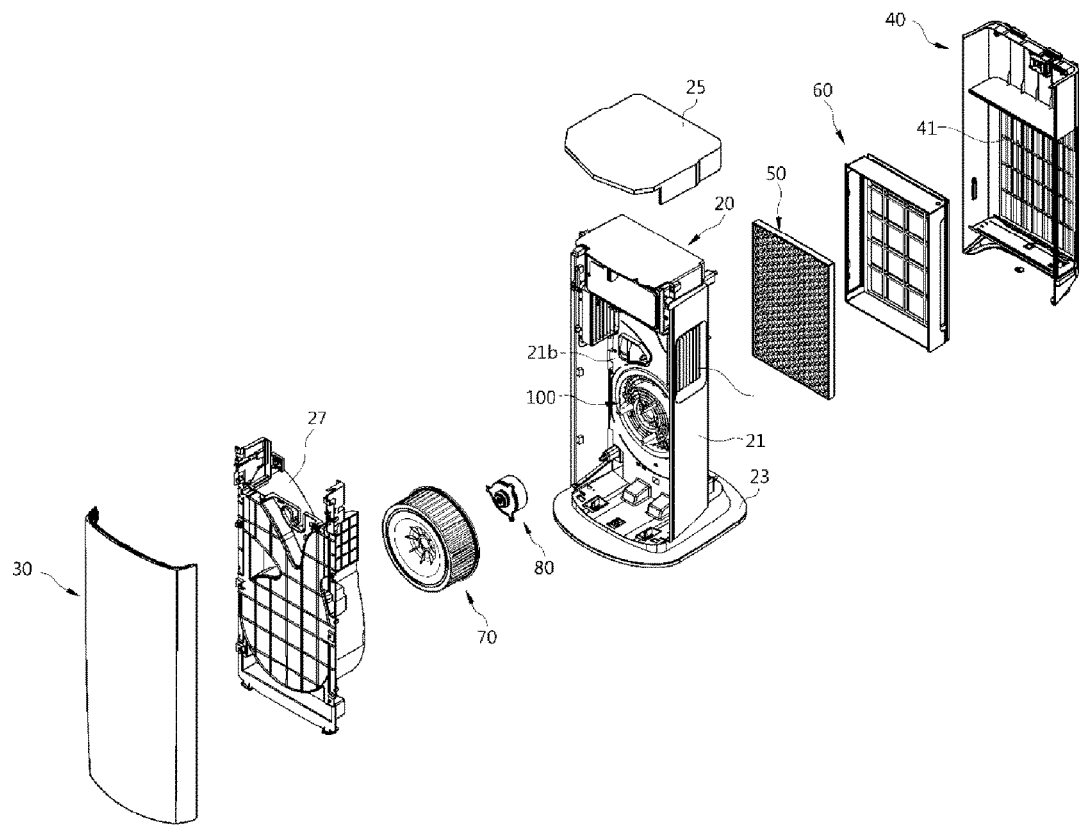
FIG. 3 is an exploded perspective view of the air cleaner illustrated in FIG. 2, illustrated from a different direction.
Figure 4:
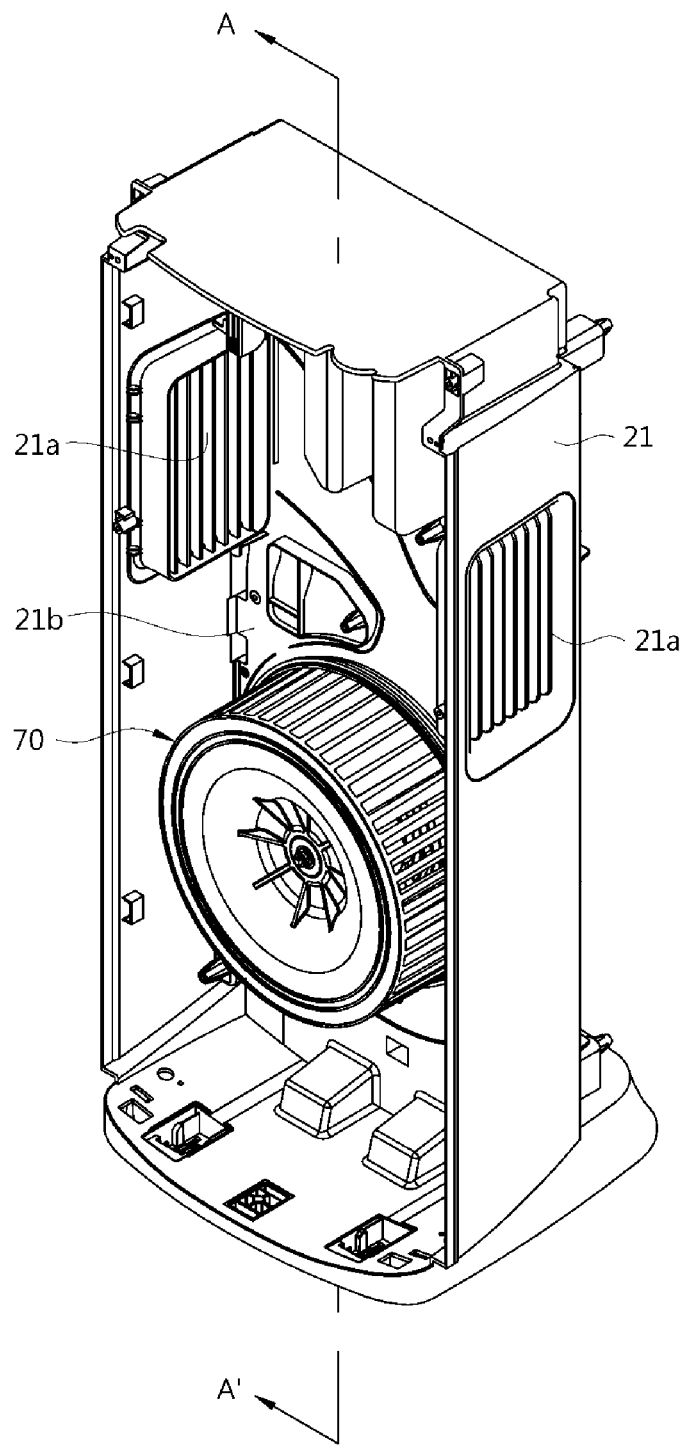
FIG. 4 is a view illustrating a state in which a blower fan is coupled to a case body according to an embodiment.
Figure 5:
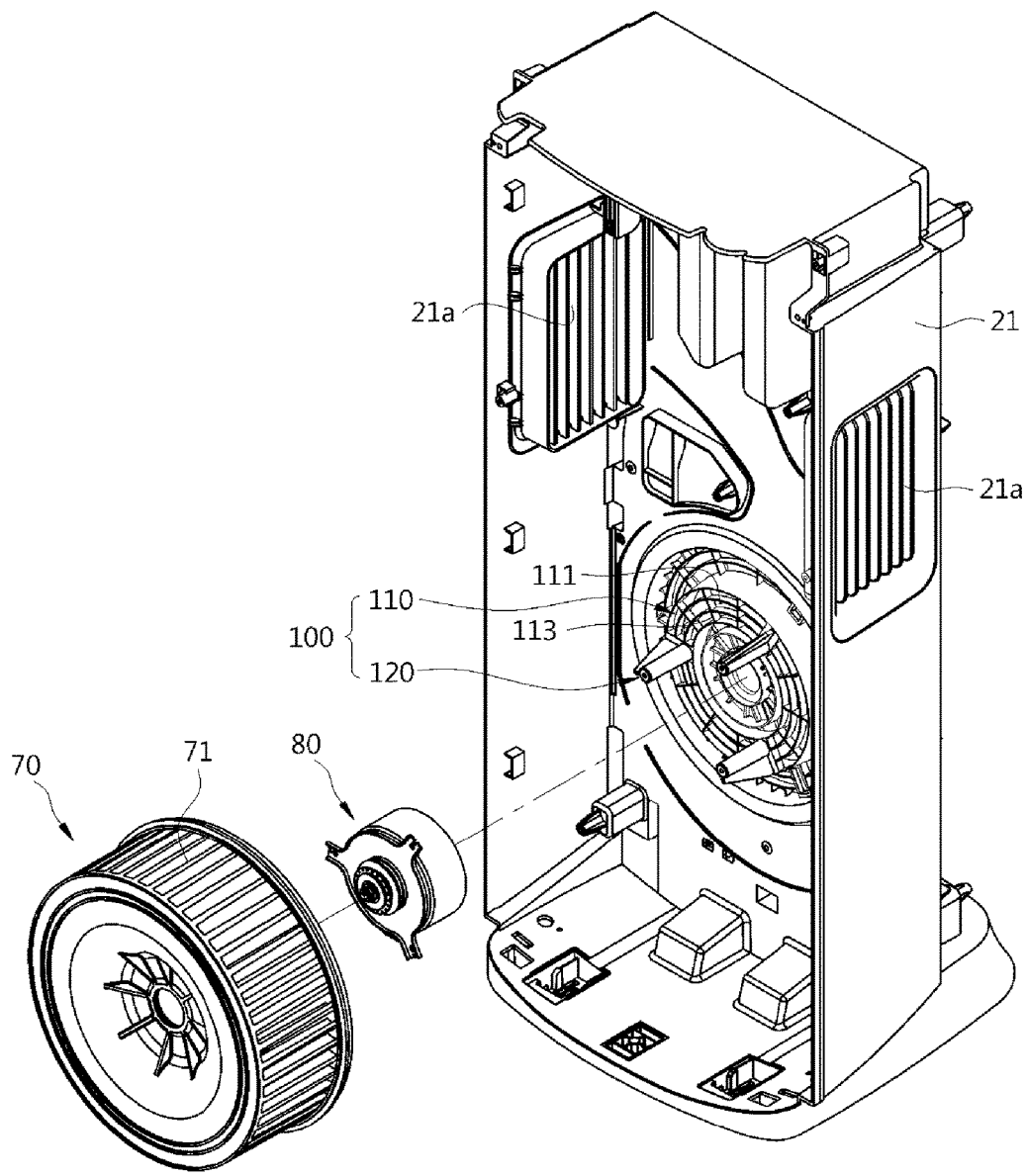
FIG. 5 is a view illustrating a state in which a blower fan and a motor are separated from a case body according to an embodiment.
Figure 6:
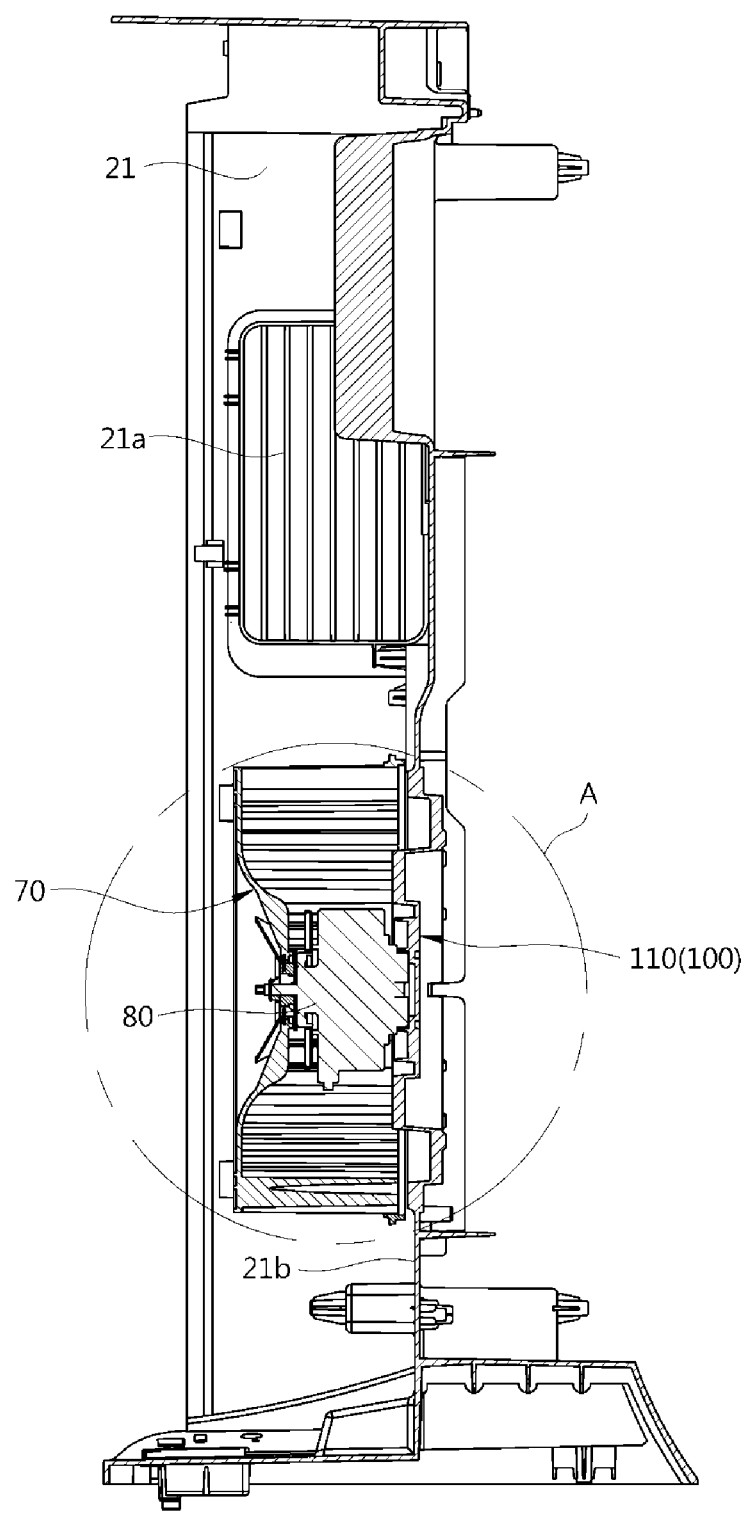
FIG. 6 is a side cross-sectional view illustrating a case body to which a blower fan and a motor are coupled according to an embodiment.
Figure 7:
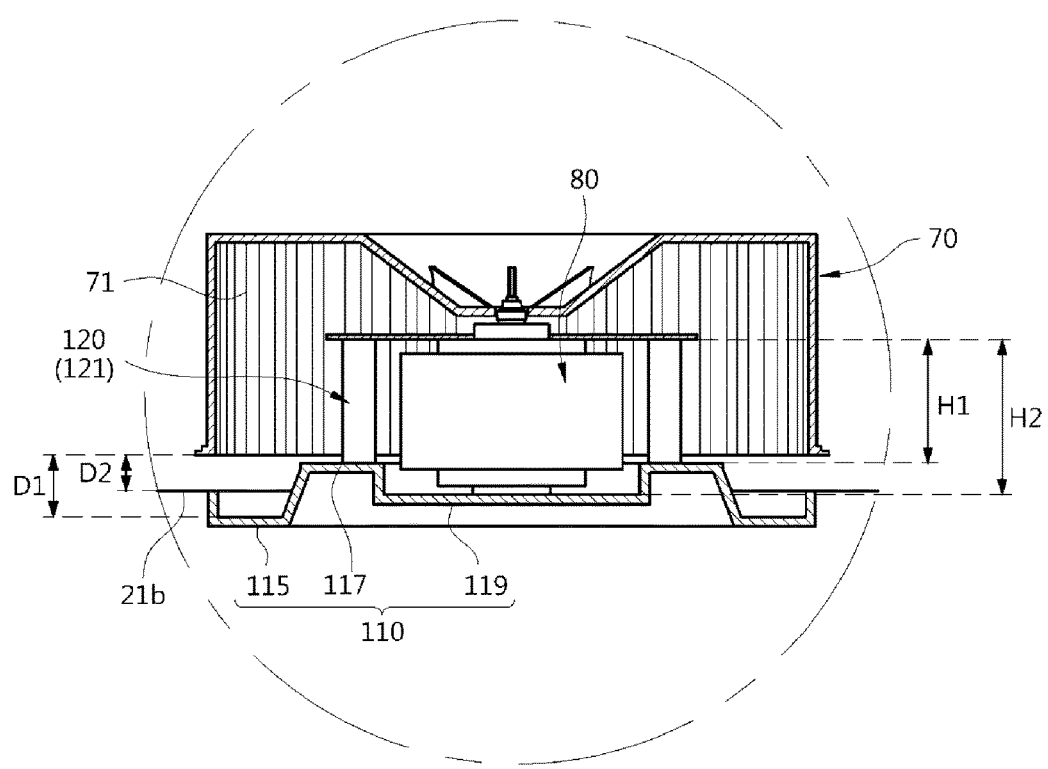
FIG. 7 is a cross-sectional view schematically illustrating the portion A of FIG. 6.
Figure 8:
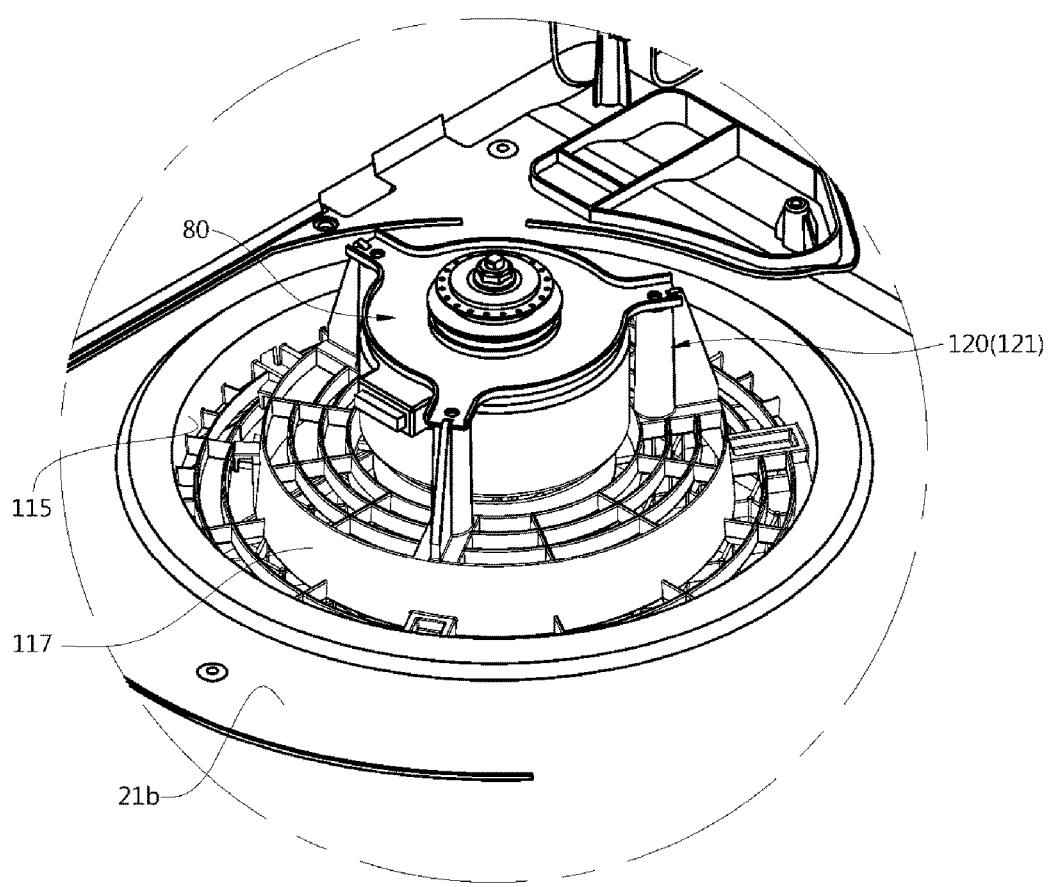
FIG. 8 is a view illustrating a state in which a motor is installed at a motor installation portion according to an embodiment.

As illustrated in FIGS. 1 to 3, an air cleaner includes a main body 10 configured to form an appearance thereof, a filter member 50 provided at an inside of the main body 10 and configured to filter or sterilize particles from air suctioned into the inside of the main body 10, a blower fan 70 provided at the inside of the main body 10, configured to guide air outside of the main body 10 to be suctioned into the inside of the main body 10, and configured to induce the air suctioned into the inside of the main body 10 to be discharged to the outside of the main body 10, and a motor 80 configured to drive the blower fan 70.

The main body 10 may include a case 20 having outlets 21a, a front panel 30 disposed at a front side of the case 20, and a back panel 40 disposed at a back side of the case 20 and having an inlet 41.

The case 20 may include a case body 21 having the outlets 21a provided at two sidewalls and configured to accommodate the blower fan 70 and the motor 80, a base 23 provided at a lower portion of the case body 21 and configured to support the main body 10, an upper cover 25 provided at an upper portion of the case body 21, and a duct 27 having a guide path 27a configured to guide air suctioned into the inlet 41 provided at the back panel 40 to the outlet 21a.

In the drawing, the inlet 41 may be provided at the back panel 40, and the outlet 21a is provided at two sidewalls of the case body 21, however, the present invention is not limited thereto, and they may be provided at different locations.

The case body 21 may include a partition 21b provided to form a space in which the blower fan 70 and the motor 80 are accommodated between the case body 21 and the front panel 30, and the partition 21b may include a fan guard 100 which will be described below.

The duct 27 may be disposed between the case 20 and the front panel 30, and the duct 27 include the guide path 27a configured to guide air suctioned into the inlet 41 and passing through the blower fan 70 to be discharged to the outlet 21a.

The back panel 40 may be disposed at a back side of the case 20, the back panel 40 may include the inlet 41 configured to suction air outside of the main body 10 into an inside of the main body 10.

The filter member 50 configured to filter or sterilize particles from air suctioned into the inlet 41 is provided between the case 20 and the back panel 40, the filter member 50 is fixed to a filter member fixing portion 60 coupled to the back panel 40.

The filter member 50 may optionally include a pre-filter as a sieve having comparatively large gaps, a cleaning filter using an electrostatic precipitator, a fine particle collecting filter in the form of a felt made of a polypropylene resin or a polyethylene resin, or a granular activated carbon filter, or may be disposed to overlap these filters.

Based on the partition 21b may be provided in the case body 21, the duct 27, the blower fan 70, and the motor 80 may be disposed in a space between the partition 21b and the front panel 30, the filter member 50 may be disposed in a space between the partition 21b and the back panel 40.

The blower fan 70 may be disposed between the case 20 inside of the main body 10 and the front panel 30, and may be disposed in the guide path 27a disposed between the case 20 and the front panel 30 and configured to guide air suctioned into the inlet 41 to the outlet 21a.

The blower fan 70 disposed in the guide path 27a induces air outside of the main body 10 to be suctioned into the inlet 41, and induces the air suctioned into the inlet 41 to be discharged to the outlet 21a.

Even though the blower fan 70 may be provided with a sirocco fan in which a suctioning direction and a discharging direction form a right angle, it is not limited thereto.

When the blower fan 70 is not provided with the sirocco fan, the location of the inlet and the outlet may be changed according to the suctioning direction and the discharging direction of the blower fan 70.

The motor 80 may be provided to drive the blower fan 70, and may be capable of rotating a driving shaft with the same center of rotation as the blower fan 70.

The partition 21b of the case body 21 includes the fan guard 100 configured to guide air suctioned into the inlet 41 to the blower fan 70.

As illustrated in FIGS. 4 to 8, the fan guard 100 may be provided at the partition 21b of the case body 21, and guides air suctioned into inlet 41 to the blower fan 70, and the motor 80 configured to drive the blower fan 70 is fixed to the fan guard 100.

The fan guard 100 may include a guide grill 110 configured to guide air suctioned into the inlet 41 to the blower fan 70, and a motor installation portion 120 in which the motor 80 is installed.

The guide grill 110 may include a plurality of ribs 113 configured to form a plurality of openings 111 so as to guide air suctioned into the inlet 41 to the blower fan 70.

The guide grill 110 may include a first bent portion 115 bent to have a shape protruding from the partition 21b toward a back of the partition 21b, a second bent portion 117 bent to have a shape protruding from the first bent portion 115 toward a front of the partition 21b, and a third bent portion 119 bent to have a shape protruding from the second bent portion 117 toward the rear of the partition 21b.

The first bent portion 115 may be bent and provided to have a shape protruding away from a back end of a blade 71 of the blower fan 70 at an edge of the guide grill 110.

Since in an embodiment the first bent portion 115 may be bent to protrude away from the back end of the blade 71 of the blower fan 70, a gap D1 between the back end of the blade 71 of the blower fan 70 and the first bent portion 115 is provided to be wider than a gap D2 between the back end of the blade 71 of the blower fan 70 and the partition 21b.

Since in an embodiment the guide grill 110 may be provided in a state in which the gap D1 between the back end of the blade 71 of the blower fan 70 and the first bent portion 115 of the guide grill 110 adjacent to the back end of the blade 71 of the blower fan 70 is wider than the gap D2 between the back end of the blade 71 of the blower fan 70 and the partition 21b, the distance between the blade 71 of the blower fan 70 and the guide grill 110 may be sufficiently secured, air suctioned into the inlet 41 may be guided to the blower fan 70, and noise generated when the blower fan 70 rotates may be reduced.

The second bent portion 117 may be bent and provided to have a shape protruding from the first bent portion 115 in a direction opposite to the first bent portion 115.

Since in an embodiment the second bent portion 117 may be bent to have a shape protruding in a direction opposite to the first bent portion 115 and provided to protrude forward more than the partition 21b, the second bent portion 117 is disposed closer the motor 80 than the partition 21b.

The second bent portion 117 may be adjacent the motor installation portion 120 in which the motor 80 is installed, and the motor installation portion 120 may include a plurality of supports 121 configured to support the motor 80.

Even though, in the drawing, the motor installation portion 120 may include the plurality of supports 121 that supports the motor 80, it is not limited thereto, and various shapes thereof capable of fixing the motor 80 may be provided.

The third bent portion 119 may be bent and provided to have a shape protruding from the second bent portion 117 in the same direction as the first bent portion 115.

Thus, the guide grill 110 may be bent and provided to have a shape in which the second bent portion 117 protrudes forward more than the partition 21b, in which the blower fan 70 and the motor 80 are disposed, and is bent and provided to have a shape in which the first bent portion 115 and the third bent portion 119 protrude rearward of the partition 21b.

Since the guide grill 110 may be provided to have a plurality of bent cross sections, the strength of the guide grill 110 may be increased.

Even though the thicknesses of the plurality of ribs 113 configured to form the guide grill 110 is capable of being increased or the number of ribs 113 is capable of being increased to increase the strength of the guide grill 110, when the strength of the guide grill 110 is increased using the latter method, air is not capable of smoothly flowing because the openings 111 provided in a plurality of a larger number are narrowed.

Thus, when the guide grill 110 is provided to have the plurality of bent cross sections, the strength may be increased to be capable of effectively supporting the static load and a dynamic load of the blower fan 70 and the motor 80, and air may be also capable of flowing smoothly.

The motor installation portion 120 configured to fix the motor 80 is provided at the second bent portion 117 of the guide grill 110.

The motor installation portion 120 may include the plurality of supports 121 which are provided to have a rod shape protruding from the second bent portion 117 toward the motor 80.

Since the second bent portion 117 may be provided to protrude forward, that is, toward the motor 80, and the third bent portion 119 is provided to protrude rearward, that is, the direction opposite to the second bent portion 117, the motor 80 is supported by the plurality of supports 121 so that a part of a lower portion thereof is accommodated inside of the third bent portion 119.

Thus, the height H1 of the plurality of supports 121 provided at the second bent portion 117 may be provided to have a lower height than the height H2 of the motor 80.

When the guide grill 110 is not provided to have the plurality of bent cross sections and is horizontally provided with the partition 21b, the plurality of supports 121 are provided to have the same height with the height of the motor 80. However, when the guide grill 110 is provided to have the plurality of bent cross sections, the height of the plurality of supports 121 is capable of being lowered, and thus the strength against the vibration of the motor 80 may be capable of being increased.

Figure 9:
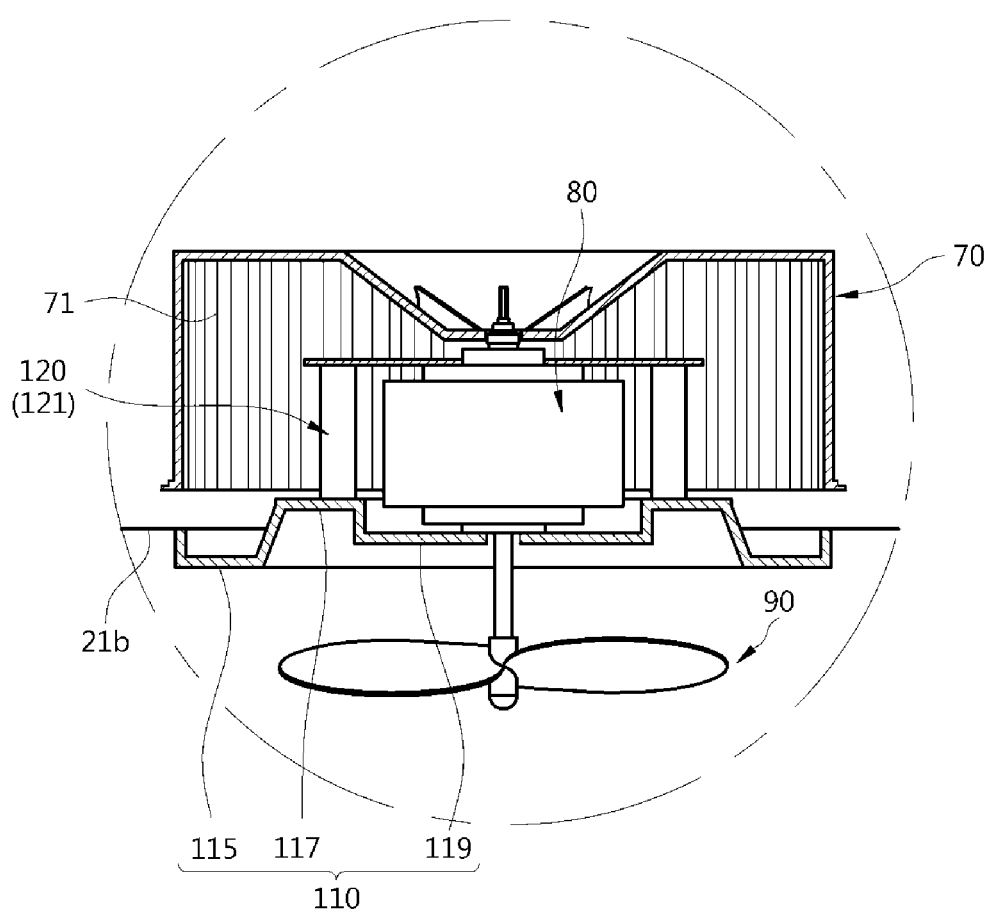
FIG. 9 is a view illustrating a state in which a turbofan is additionally provided to the configuration illustrated in FIG. 7.

As illustrated in FIG. 9, a turbofan 90 may be provided at a back side of the motor 80 so as to enable air to flow smoothly.

Since the guide grill 110 is provided to have the plurality of bent cross sections to increase the strength thereof, even though the blower fan 70, that is, the sirocco fan is provided at a front side of the motor 80, and the turbofan 90 is provided at an back side thereof, the guide grill 110 is effectively capable of supporting the static load and the dynamic load of the blower fan 70, the motor 80, and the turbofan 90, and is capable of enabling air to flow smoothly.

Figure 10:
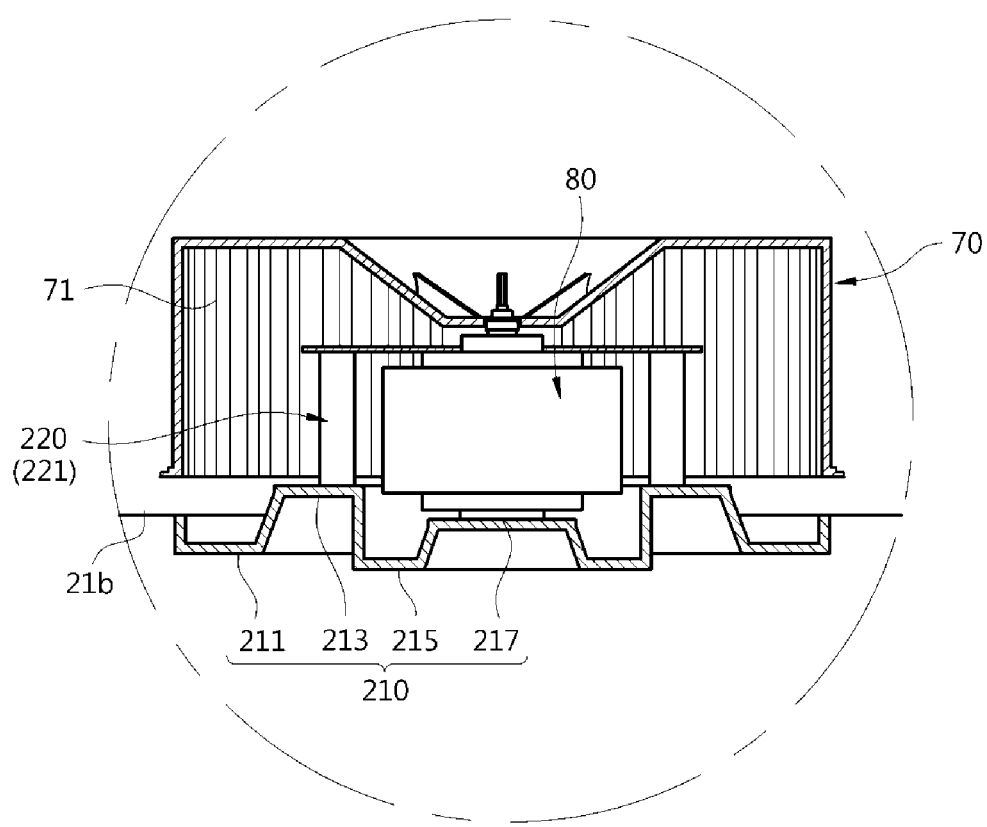
FIG. 10 is a view illustrating a different embodiment of the configuration illustrated in FIG. 7.

As illustrated in FIG. 10, a guide grill 210 of a fan guard 200 may include a first bent portion 211 bent to have a shape protruding from a partition 21b toward a rear of the partition 21b, a second bent portion 213 bent to have a shape protruding from the first bent portion 211 toward a front of the partition 21b, a third bent portion 215 bent to have a shape protruding from the second bent portion 213 toward the rear of the partition 21b, and a fourth bent portion 217 bent to have a shape protruding from the third bent portion 215 toward the front of the partition 21b.

As described above, when the number of bent portions 211, 213, 215, and 217 of the guide grills 210 are increased, the strength of the guide grill 210 may be capable of being increased.

Figure 11:
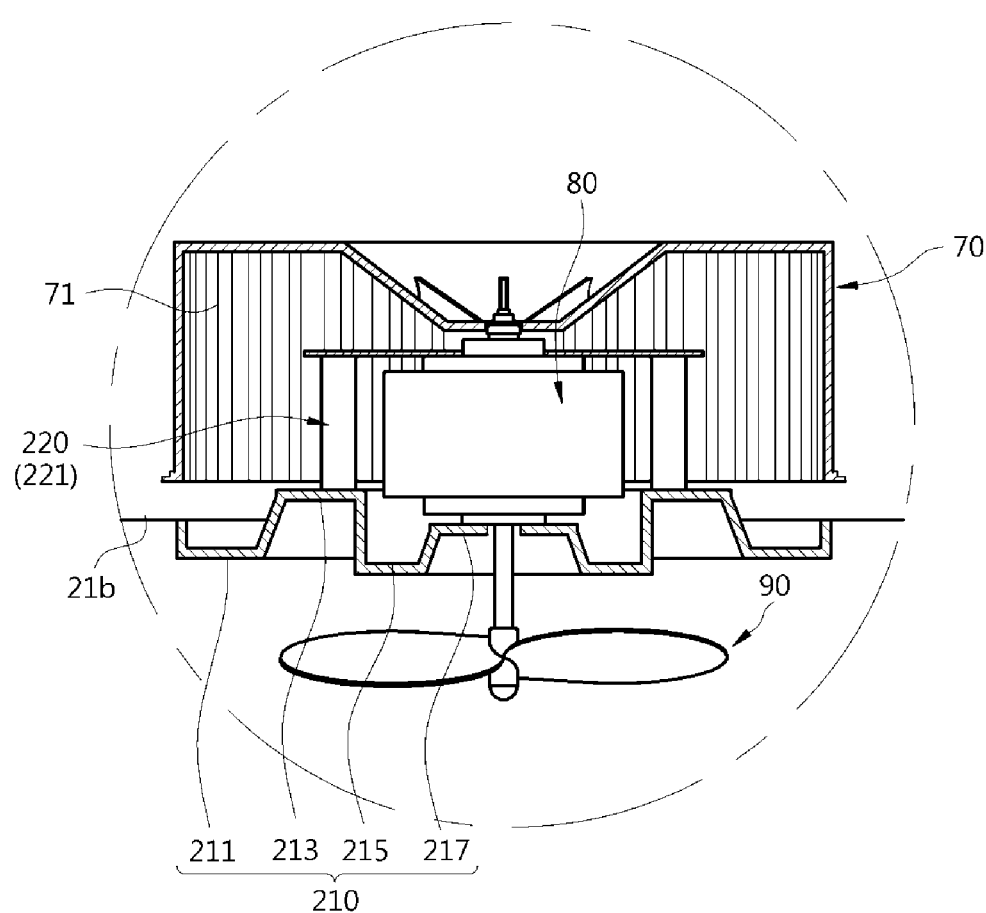
FIG. 11 is a view illustrating a state in which a turbofan is provided to the configuration illustrated in FIG. 10.

In addition, when the number of bent portions 211, 213, 215, and 217 of the guide grill 210 are increased, and a turbofan 90 is also additionally disposed as illustrated in FIG. 11, the blower fan 70, motor 80, and turbofan 90 may be capable of being effectively supported.

In the above description, even though the fan guard is provided at an air cleaner, it is not limited thereto, and it is apparent that the fan guard is capable of being applied to home appliances such as an air conditioner to which a fan and a motor are applied.

As is apparent from the above description, an air cleaner in accordance with one embodiment of the present invention can enable the strength of a fan guard configured to fix a motor to be increased, and simultaneously enable air to flow smoothly.

In addition, a cleaner can reduce a noise generated when a blower fan rotates, and increase the strength of a motor installation portion configured to support a motor.

Although an air cleaner has been shown and described based on a specific shape and orientation in accordance with the accompanying drawings, it would be appreciated by those skilled in the art that changes and variations of the shapes may be made in these embodiments without departing from the principles and spirit of the invention, the changes and variations are included in the scope of the present invention, and the scope of which is defined in the claims and their equivalents.

What is claimed is:

1. An air cleaner, comprising:
a main body including an inlet and an outlet;
a blower fan provided inside of the main body, and configured to induce air from outside of the main body to be suctioned into the inlet and to be discharged to the outlet;
a motor configured to drive the blower fan; and
a fan guard to support the motor, and the fan guard configured to guide air suctioned into the inlet to the blower fan,
wherein the fan guard has a plurality of bent cross sections extending in a radial direction of the blower fan and positioned at different distances across a space in which the blower fan and the motor are accommodated,
the fan guard includes a guide grill configured to guide air suctioned into the inlet to the blower fan, and a motor installation portion in which the motor is installed,
wherein the guide grill includes a plurality of ribs forming a plurality of openings so as to guide air suctioned into the inlet to the blower fan, and the plurality of bent cross sections are provided as part of the guide grill to increase strength thereof.

2. The air cleaner of claim 1, wherein the main body includes a case including the outlet, a front panel disposed at a front side of the case, and a back panel disposed at a back side of the case and including the inlet.

3. The air cleaner of claim 2, wherein the case includes:
a case body to which the outlet is provided at one of two sidewalls of the case body, the case body having another outlet provided at another one of the two sidewalls, and the case body being configured to accommodate the blower fan and the motor, and
a base provided at a lower portion of the case body and configured to support the main body, an upper cover provided at an upper portion of the case body, and a duct including a guide path configured to guide air suctioned into the inlet to the outlet.

4. The air cleaner of claim 3, wherein the case body includes a partition to form the space in which the blower fan and the motor are accommodated which is between the case body and the front panel, and the fan guard is provided at the partition.

5. The air cleaner of claim 1, wherein the plurality of bent cross sections provided as part of the guide grill include a first bent portion bent to have a shape protruding from the partition toward a rear of the partition, a second bent portion bent to have a shape protruding from the first bent portion toward a front of the partition, and a third bent portion bent to have a shape protruding from the second bent portion toward the rear of the partition.

6. The air cleaner of claim 5, wherein a gap between a back end of a blade of the blower fan and the first bent portion is provided to be wider than a gap between the back end of the blade of the blower fan and the partition.

7. The air cleaner of claim 5, wherein the second bent portion is provided to protrude forward more than the partition.

8. The air cleaner of claim 7, wherein the motor installation portion is provided at the second bent portion, and includes a plurality of supports configured to support the motor.

9. The air cleaner of claim 8, wherein at least a part of a lower portion of the motor supported by the plurality of supports is accommodated inside of the third bent portion.

10. The air cleaner of claim 9, wherein the plurality of supports are provided to have a lower height than the motor.

11. The air cleaner of claim 1, comprising:
a support configured to support the motor, wherein a first of the plurality of bent cross sections accommodates the motor to be at a lower height than a second of the plurality of bent cross sections on which the support is provided.

12. An air cleaner, comprising:
a main body including an inlet and an outlet;
a blower fan provided inside of the main body, and configured to induce air from outside of the main body to be suctioned into the inlet and to be discharged to the outlet;
a motor configured to drive the blower fan; and
a fan guard including a guide grill extending along a radial direction of the blower fan, the guide grill configured to guide air suctioned into the inlet to the blower fan, and a motor installation portion on which the motor is installed at the guide grill,
wherein an edge portion of the guide grill adjacent to a blade of the blower fan is bent away from the blade of the blower fan, and a portion including the motor installation portion of the guide grill is bent toward the motor,
wherein the guide grill includes a first bent portion bent to have a shape protruding away from the blade of the blower fan at the edge portion of the guide grill, a second bent portion bent to have a shape protruding from the first bent portion in a direction opposite to the first bent portion, and a third bent portion bent to have a shape protruding from the second bent portion in the same direction as the first bent portion.

13. The air cleaner of claim 12, wherein the motor installation portion is provided at the second bent portion, and includes a plurality of supports configured to support the motor.

14. The air cleaner of claim 13, wherein the plurality of supports are provided to have a rod shape protruding from the second bent portion toward the motor.

15. The air cleaner of claim 14, wherein a part of a lower portion of the motor supported by the plurality of supports is accommodated inside of the third bent portion configured to protrude toward the direction opposite to the second bent portion, and the plurality of supports have a lower height than the motor.

* * * * *